United States Patent [19]

Tsai

[11] Patent Number: 5,033,509

[45] Date of Patent: Jul. 23, 1991

[54] STRUCTURE OF WATER FLOW CONTROL DEVICE

[76] Inventor: Chen-Hsien Tsai, No. 103, Da-Ming 1 Rd., Tien-Tzu Hsiang, Taichung Hsien, Taiwan

[21] Appl. No.: 572,549

[22] Filed: Aug. 27, 1990

[51] Int. Cl.⁵ ............................................. F16K 31/524
[52] U.S. Cl. ................................ 137/624.12; 251/238
[58] Field of Search ...................... 137/624.12, 624.11; 251/238, 321

[56] References Cited

U.S. PATENT DOCUMENTS

| | | | |
|---|---|---|---|
| 3,880,190 | 4/1975 | Boss | 137/624.12 |
| 4,562,865 | 1/1986 | Lemkin | 137/624.12 |
| 4,836,247 | 6/1989 | Chuang | 137/624.12 |

*Primary Examiner*—Alan Cohan

*Attorney, Agent, or Firm*—Fleit, Jacobson, Cohn, Price, Holman & Stern

[57] ABSTRACT

A water flow control device comprising a water flow control system controlled to operate by a timer system. The timer system comprises a timer fastened in a control wheel mounted on a mounting table for time setting. The water flow control system comprises a control tube fastened in a trough with both ends respectively connected with water inlet and outlet pipes. A spirng is sleeved on the control tube to constantly force the control tube to press on a stop cap which releasably block up the water passage of the water inlet pipe. A driving plate is pivoted to the trough and controlled by the mounting table through the timer to carry the control tube backward permitting the stop cap to open the water passage so that water is allowed to pass through the control tube into the water outlet pipe.

3 Claims, 5 Drawing Sheets

11

STRUCTURE OF WATER FLOW CONTROL DEVICE

BACKGROUND OF THE INVENTION

The present invention relates to water flow control device, and more particularly to a water flow control device which comprises a water flow control system controlled by a timer system to let flow of water pass or stop flow of water at predetermined times.

In regular water supply system or irrigation project, water pipe-line is used to guide water from sources of irrigation water to irrigation districts. For controlling the flow of water, a water flow control device shall be attached. Conventionally a water flow control device is generally controlled through manual operation, which can not automatically stop the supply of water at predetermined times.

SUMMARY OF THE INVENTION

The main object of the present invention is to provide a water flow control device which can automatically stop the supply of water. According to the present invention, a water flow control device is generally comprised of a water flow control system controlled to operate by a timer system. The timer system comprises a timer linking up with a control wheel which has a ring-shaped projection at the bottom to control the operation of the water flow control system. The water flow control system comprises a trough having a control tube fastened therein and constantly pushed by a compression spring to force a stop cap to stop the water intake. By means of time setting, the control tube is carried by a driving plate, which is pivoted to the trough, to move away from the stop cap so that flow of water is permitted to pass through the control tube into a water outlet pipe for further distribution. Upon zero reading of the timer, the control tube is released from the constraint of the driving plate and immediately pushed by the compression spring to force the stop cap to block up the water intake. Therefore, flow of water is automatically stopped from entering the water outlet pipe.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
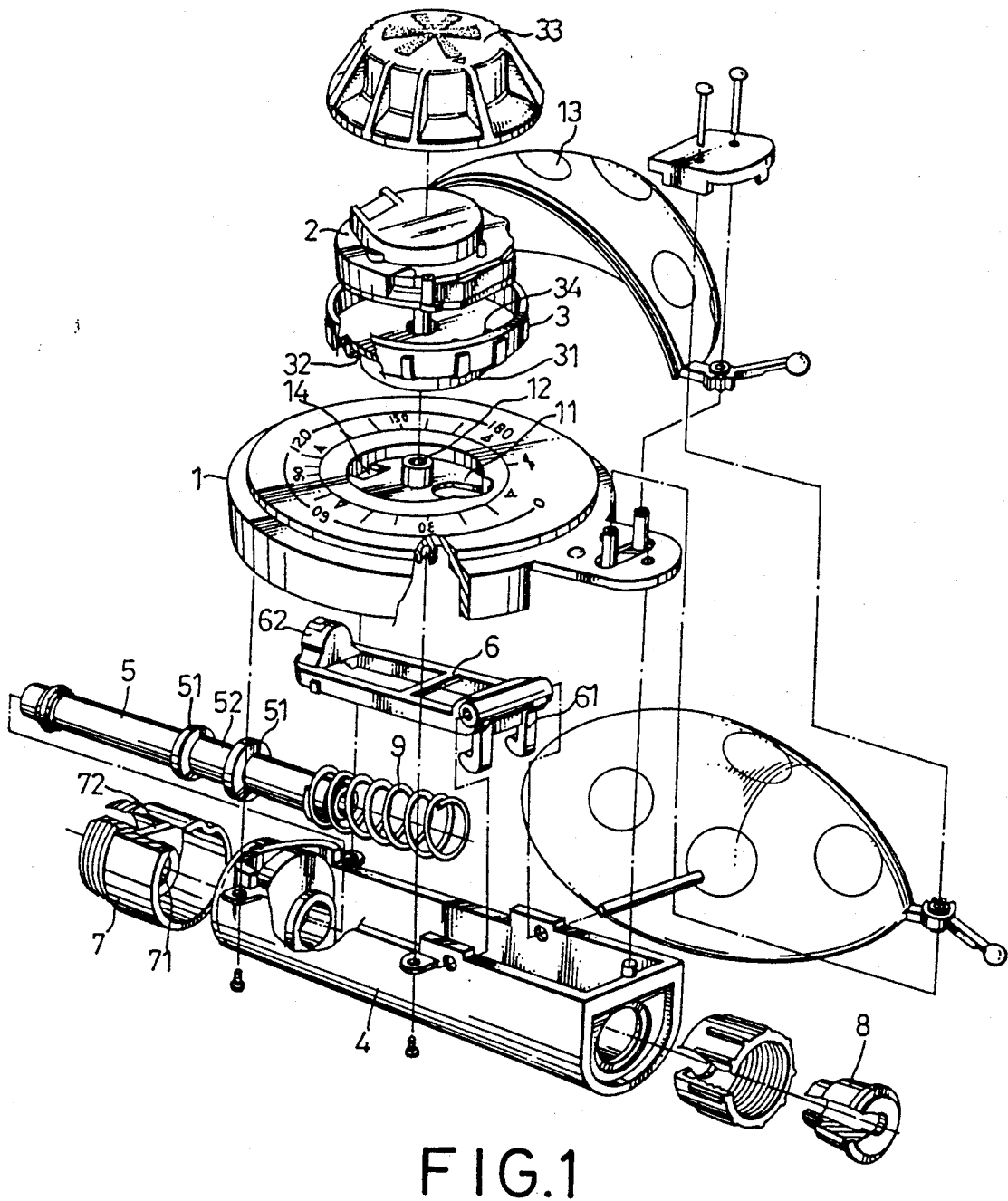
FIG. 1 is a perspective dismantled view of the preferred embodiment of the present invention.

Turning now to the annexed drawings in greater detail and referring first to FIG. 1, therein illustrated is a water flow control device embodying the present invention and generally comprised of a timer system which comprises a mounting table 1, a timer 2 and a control wheel 3, and a water flow control system which comprises a trough 4, a control tube 5, a driving plate 6, a water inlet pipe 7 and a water outlet pipe 8.

The mounting table 1 has an unitary vent stem 12 at the center and surrounded by a circular recess 11 thereof for mounting the control wheel 3 and the timer 2. The control wheel 3 has a ring-shaped projection 31 extending downward therefrom for insertion in the circular recess 11 of the mounting table 1, which ring-shaped projection 31 has a notch 32 at one side. The timer 2 has a mainspring shaft 21 at the bottom and inserted through the control wheel 3 into the vent stem 12 of the mounting table 1. After the timer 2 is mounted in the control wheel 3 and secured in the mounting table 1, it becomes firmly retained by the projecting strips 34 of the control wheel 3 so that the control wheel 3 follows the timer 2 to move synchronously. After the mounting of the timer 2, an upper cap 33 is attached to the control wheel 3 to cover the timer 2 for protection. The mounting table 1 has two opposite top guard 13 pivotably attached thereto at two opposite sides for covering the timer 2 and the control wheel 3.

Figure 2:
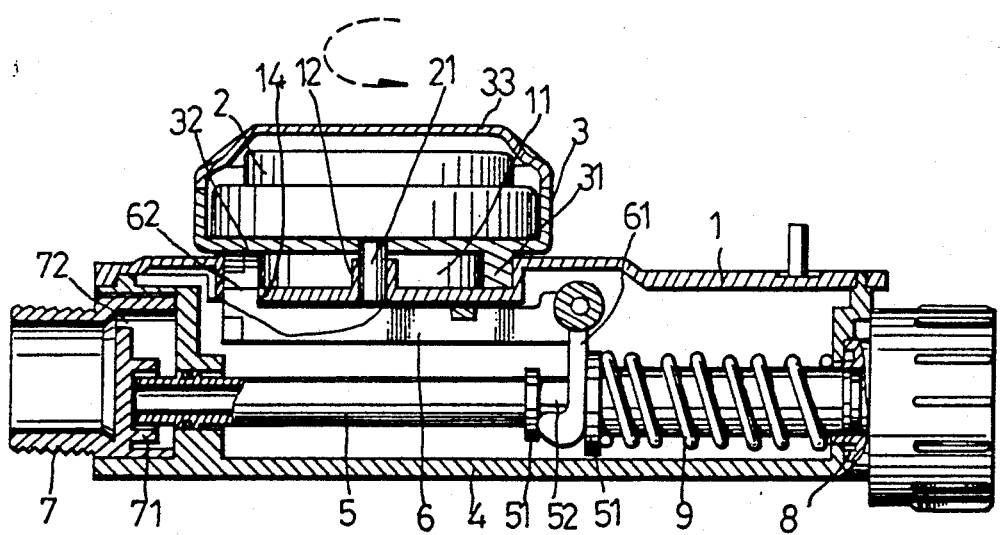
FIG. 2 is a sectional assembly view thereof, in which the water passage is blocked up from the control tube.

The water inlet and outlet pipes 7, 8 are respectively attached to the trough 4 at two opposite ends. The control tube 5 which has two collars 51 defining therebetween a circular groove 52 is longitudinally fastened in the trough 4. The driving plate 6 is pivoted to the trough 4 at a suitable location and has unitary hook rods 61 at its pivoted end for hooking in the circular groove 52 of the control tube 5. There is a compression spring 9 sleeved on the control tube 5 and stopped at one of the collars 51 near the water outlet pipe 8 to constantly push the control tube 5 to move toward the water inlet pipe 7. The water inlet pipe 7 has therein a curved water passage 72 for passing therethrough of water into the control tube 5, which water passage 72 is releasably stopped by a stop cap 71 and its attached seal ring. After the mounting table 1 is secured to the trough 4 by screws or fastening means, the unitary push block 62, which is made on the other end opposite to the hook rods 61 of the driving plate 6, is disposed in an opening 14 on the circular recess 11 of the mounting table 1. Therefore, the spring force of the compression spring 9 pushes the hook rods 61 of the driving plate 6, via the control tube 5, to force the push block 62 to insert through the opening 14 of the circular recess 11 of the mounting table 1 to move the ring-shaped projection 31 of the control wheel 3 upward (see FIG. 2). If the timer 2 is reset to zero reading, the push block 62 is just disposed in the notch 32 of the ring-shaped projection 31, the driving plate 6 is maintained in a horizontal position, the control tube 5 is forced to firmly stop against the stop cap 71 to block up the water passage 72 of the water inlet pipe 7. Therefore, no water is allowed to enter the control tube 5. Further, there are two water gaskets 53 fastened at two opposite ends of the control tube 5 to offectively protect against water leakage between the trough 4 and the water inlet and outlet pipes 7, 8.

Figure 3:
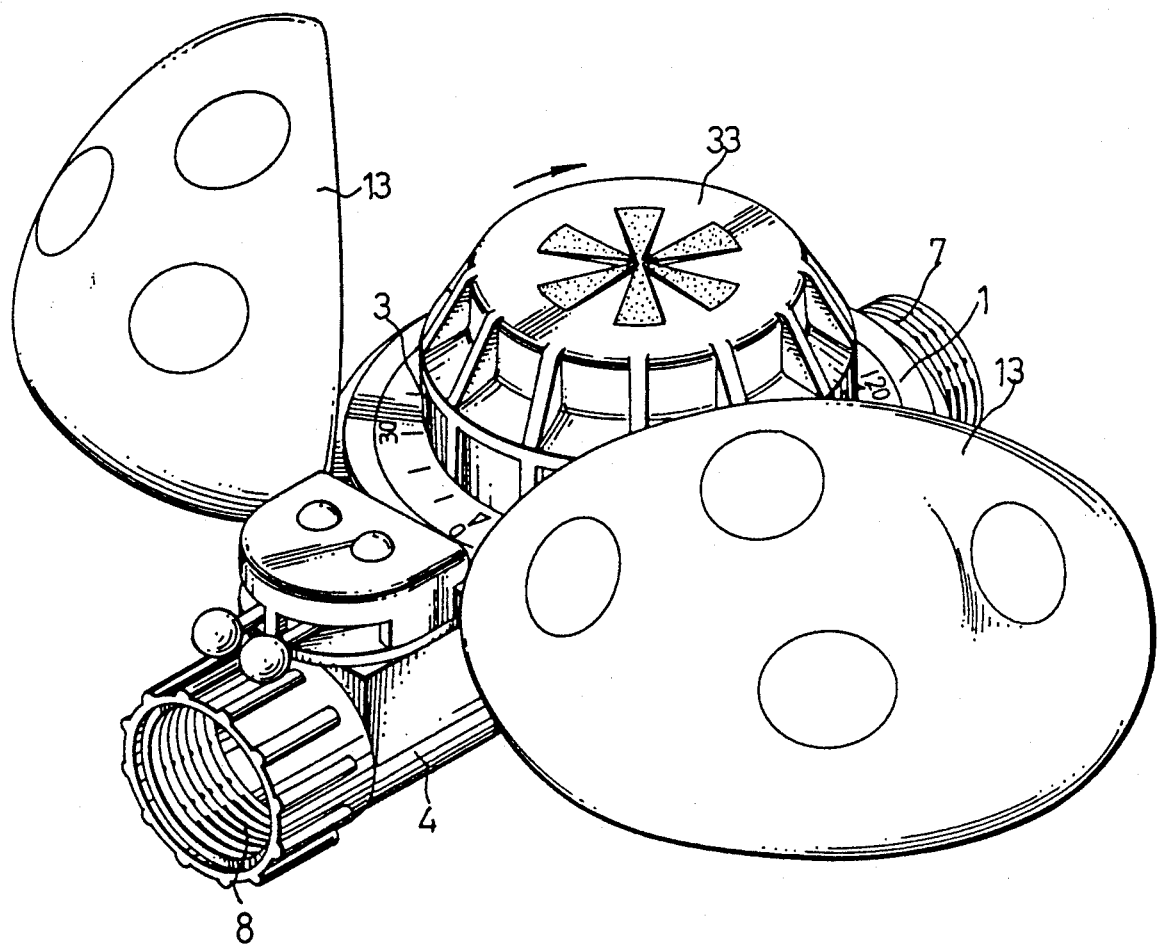
FIG. 3 is a perspective schematic view illustrating the operation of the present invention to rotate the control wheel for time setting.
Figure 4:
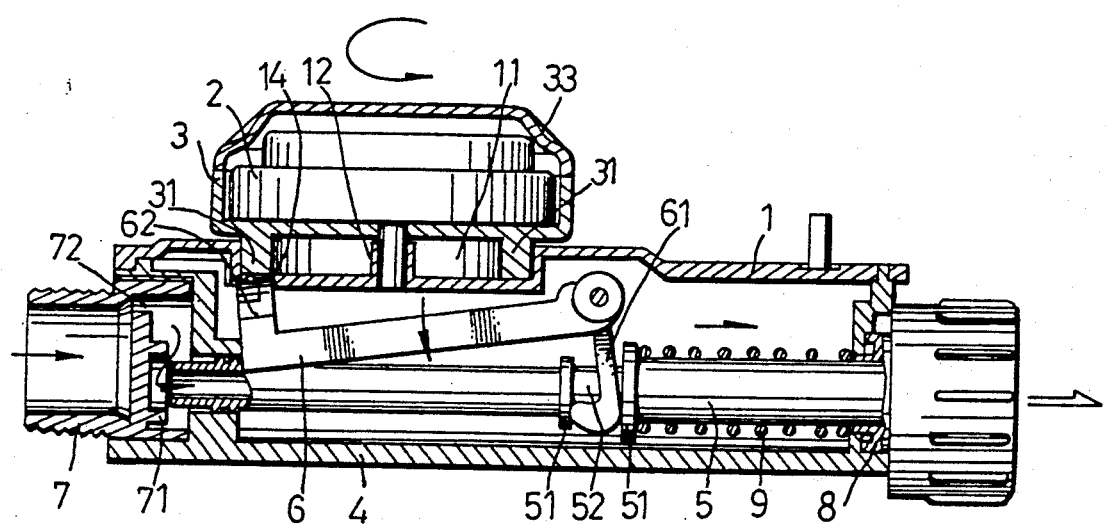
FIG. 4 is a perspective sectional view illustrating the operation of the present invention to let water pass therethrough.

Referring to FIG. 3, the mounting table 1 has a time scale on its top surface with which the control wheel 3 can be rotated for time setting. When the control wheel 3 is rotated, the push block 62 is simultaneously forced by the ring-shaped projection 31 to move downward so as to drive the hook rods 61 of the driving plate 6 to push the control tube 5 to squeeze the compression spring 9 (see FIG. 4). During backward displacement of the control tube 5, the stop cap 71 is released from the water passage 72 to permit water to flow through the control tube 5 into the water outlet pipe 8 for further water distribution. When a predetermined time is up, the notch 32 of the ring-shaped projection 31 of the control wheel 3 is returned to the position at the opening 14 of the circular recess 11 permitting the compression spring 9 to force the push block 62 to insert through the opening 32 of the circular recess 31 and simultaneously to push the control tube 5 to force the stop block 71 to block up the water passage 72 again. Therefore, water flow is stopped from entering the control tube 5 (see FIG. 2).

Figure 5:
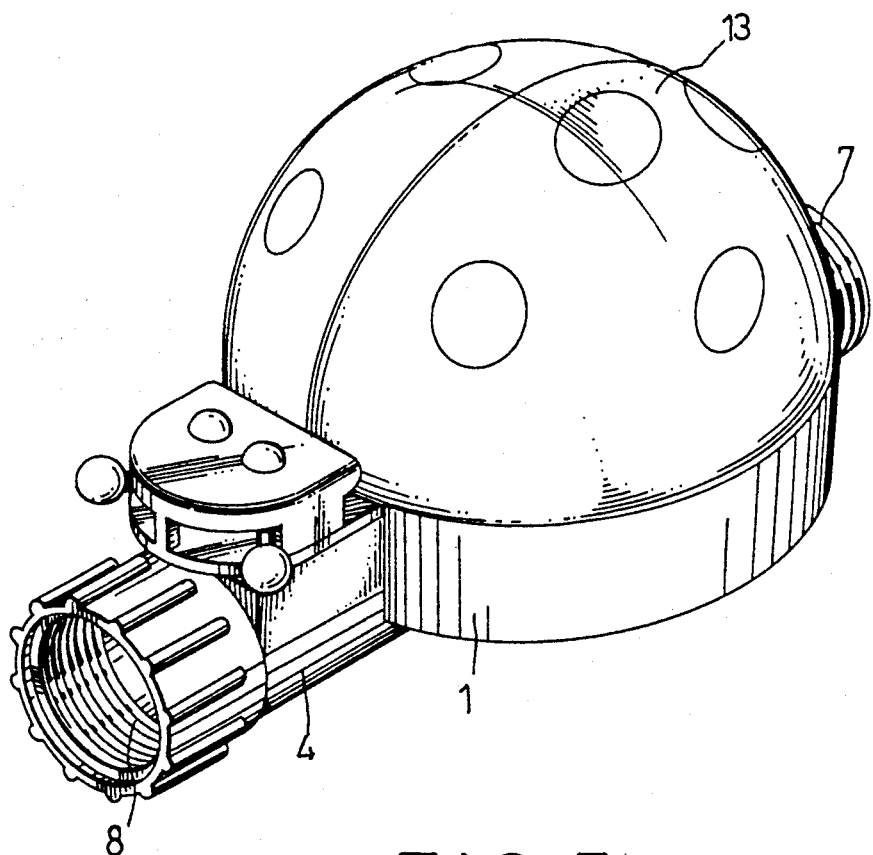
FIG. 5 illustrates the outer appearance of the preferred embodiment of the present invention.

Referring to FIG. 5, the whole structure of the water flow control device of the present invention is very compact. When in use, the water inlet pipe 7 is connected to a water source and the water outlet pipe 8 is connected to a desired location through a water conduit so as to conveniently control water supply.

I claim:

1. A water flow control device, comprising:

a timer system comprising a timer having a mainspring shaft extending downward therefrom and fastened through a control wheel into a vent stem at the center of a mounting table permitting said control wheel to move with said timer synchronously;

a water flow control system, comprising a trough having a water inlet pipe and a water outlet pipe respectively attached thereto at two opposite ends, a control tube longitudinally fastened in said trough for guiding flow of water from said water inlet pipe to said water outlet pipe, said control tube having two collars defining therebetween a circular groove, a driving plate pivoted to said trough, said driving plate having a plurality of unitary hook rods at one end for bilaterally hooking in said circular groove and a push block at an opposite end, a compression spring sleeved on said control tube and stopped at one of said collars near said water outlet pipe to constantly force said control tube to move toward said water inlet pipe, said water inlet pipe having therein a curved water passage for passing therethrough of water into said control tube and releasably stopped by a stop cap; and wherein said mounting table is fixedly secured to said trough permitting said push block of said driving plate, upon zero reading of said timer, to insert through an opening on a circular recess at the center of said mounting table to stop in a notch on a ring-shaped projection at the bottom of said control wheel, and permitting said compression spring to push said control tube to force said stop cap to block up said water passage; said push block of said driving plate being pushed by said ring-shaped projection of said control wheel, upon said timer been rotated to a predetermined time, to force said hook rods to carry said control tube to move away from said stop cap permitting water to flow through said water passage and said control tube into said water outlet pipe for further distribution.

2. The water flow control device of claim 1, wherein said control wheel is covered with a protective upper cover; said mounting table has two opposite top guard pivotably attached thereto at two opposite sides for covering said timer and said control wheel.

3. The water flow control device of claim 1, wherein two water gaskets are respectively fastened at two opposite ends of said control tube to protect against water leakage between said trough and said water inlet and outlet pipes.

* * * * *